(12) United States Patent
Mujtaba et al.

(10) Patent No.: US 7,366,250 B2
(45) Date of Patent: Apr. 29, 2008

(54) METHOD AND APPARATUS FOR IMPROVED EFFICIENCY IN AN EXTENDED MULTIPLE ANTENNA COMMUNICATION SYSTEM

(75) Inventors: Syed Aon Mujtaba, Watchung, NJ (US); Xiaowen Wang, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 372 days.

(21) Appl. No.: 11/122,147

(22) Filed: May 4, 2005

(65) Prior Publication Data

US 2006/0250943 A1    Nov. 9, 2006

Related U.S. Application Data

(60) Provisional application No. 60/608,472, filed on Sep. 9, 2004.

(51) Int. Cl.
*H04B 7/02* (2006.01)
(52) U.S. Cl. .................................. 375/267
(58) Field of Classification Search ............ 375/260, 375/267, 346; 370/338
See application file for complete search history.

(56) References Cited

U.S. PATENT DOCUMENTS

2005/0190868 A1* 9/2005 Khandekar et al. ......... 375/346
2005/0249174 A1* 11/2005 Lundby et al. ............. 370/338
2006/0067415 A1* 3/2006 Mujtaba ..................... 375/260

FOREIGN PATENT DOCUMENTS

| WO | WO 03/034642 | 4/2003 |
| WO | WO 2004/039027 | 6/2004 |
| WO | WO 2005/112323 | 11/2005 |

OTHER PUBLICATIONS

Liu et al., "A MIMO System with Backwards Compatibility for OFDM based WLANs," Signal Processing Advances in Wireless Communications, 4th IEEE Workshop on Rome, Italy, pp. 130-134 (Jun. 15, 2003).

* cited by examiner

*Primary Examiner*—Don N Vo
(74) *Attorney, Agent, or Firm*—Ryan, Mason & Lewis, LLP (57) ABSTRACT

Methods and apparatus are provided for improved efficiency in an extended multiple antenna communication system. A multiplier is employed on the number of points in the FFT that is greater than the multiplier on the frequency (bandwidth) of the legacy 802.11 a/g system. In one exemplary implementation, a 256 point FFT is employed in 40 MHz (with a 4N multiplier on the number of possible tones and a 2N multiplier on the frequency). While the efficiency for the OFDM symbol is improved, additional overhead is required in the preamble training (the length of the preamble is proportional to the number of tones in the FFT). Thus, a number of preamble constructs are provided that couple the improved efficiency with shorter preambles. In addition, an improved tone design provides additional efficiency gains.

25 Claims, 12 Drawing Sheets

METHOD AND APPARATUS FOR IMPROVED EFFICIENCY IN AN EXTENDED MULTIPLE ANTENNA COMMUNICATION SYSTEM

CROSS REFERENCE TO RELATED APPLICATION(S)

This application claims priority to U.S. Provisional Application No. 60/608,472, filed Sep. 9, 2004, incorporated by reference herein.

FIELD OF THE INVENTION

The present invention relates generally to multiple antenna wireless communication systems, and more particularly, to preamble training techniques for a multiple antenna communication system.

BACKGROUND OF THE INVENTION

Multiple transmit and receive antennas have been proposed to provide both increased robustness and capacity in next generation Wireless Local Area Network (WLAN) systems. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques. A multiple antenna communication system increases the data rate in a given channel bandwidth by transmitting separate data streams on multiple transmit antennas. Each receive antenna receives a linear combination of these transmitted data streams.

In order to properly receive the different data streams, receivers in a multiple antenna communication system must acquire a channel matrix through training. This is generally achieved by using a specific training symbol, or preamble, to perform synchronization and channel estimation techniques. It is desirable for multiple antenna communication systems to co-exist with legacy single antenna communications systems (typically referred to as Single Input Single Output (SISO) systems). Thus, a legacy (single antenna) communications system must be able to interpret the preambles that are transmitted by multiple antenna communication systems. Most legacy Wireless Local Area Network (WLAN) systems based upon OFDM modulation comply with either the IEEE 802.11a or IEEE 802.11g standards (hereinafter "IEEE 802.11a/g").

Among other benefits, OFDM systems are said to be resistant to the multipath effect of a wireless channel. To obtain this advantage, there is a guard interval in the preamble at the start of each OFDM symbol. The guard interval, however, sacrifices the efficiency of the system. Thus, system efficiency can be increased by either reducing the guard interval, which compromises the resistance to the multipath effect, or by increasing the OFDM symbol duration.

In the current 802.11a/g standard, each channel is 20 MHz wide with 64 subcarriers, which leads to an OFDM symbol duration of 3.2 μs. One proposal to increase throughput is via channel bonding. In such a scheme, the bandwidth increases to 40 MHz and the number of subcarriers to 128. However, the symbol duration in 40 MHz is still 3.2 μs. Although the link throughput doubles in 40 MHz, the efficiency of the system does not increase since the guard interval duration and symbol duration do not change. If the same guard interval duration is maintained, the symbol time can be increased to increase the system efficiency. For example, by increasing the number of subcarriers to 256, the symbol time increases to 6.4 μs. If the Guard Inteval is held constant at 0.8 μs, the throughput (and the efficiency) increases by 11.11%. Hence, if the number of subcarriers used in 40 MHz is increased to 256, a need exists for a training mechanism that covers all 256 subcarriers.

SUMMARY OF THE INVENTION

Generally, methods and apparatus are provided for improved efficiency in an extended multiple antenna communication system. While a natural extension of a conventional 802.11a/g implementation having a 64 point FFT in 20 MHz would be to a 128 point FFT in 40 MHz (i.e., a 2 times multiplier on the number of possible tones), the present invention improves the efficiency (i.e., overhead percentage) by employing a multiplier on the number of points in the FFT that is greater than the multiplier on the frequency (bandwidth) of the legacy 802.11a/g system. For example, in one exemplary implementation, a 256 point FFT is employed in 40 MHz (with a 4N multiplier on the number of possible tones and a 2N multiplier on the frequency).

While the present invention improves the efficiency for the OFDM symbol, additional overhead may be required in the preamble training (the length of the preamble is generally proportional to the number of tones in the FFT). Thus, according to further aspects of the invention, a number of preamble constructs are provided that couple the improved efficiency with shorter preambles.

When using an exemplary 256 point FFT in 40 MHz, as opposed to a natural extension to a 128 point FFT, the cyclic prefix (CP) overhead is reduced, because the data is being transmitted at a higher rate, but the length of the preamble may increase, because the number of tones to be trained is increased. Thus, another aspect of the invention provides a tone design that provides additional efficiency gains. Among other features, the disclosed exemplary tone design reduces the number of pilot tones, with respect to the number of populated tones, relative to a natural extension of the legacy system; increases the number of populated tones within a given bandwidth, relative to a natural extension of the legacy system; and employs central tones.

A more complete understanding of the present invention, as well as further features and advantages of the present invention, will be obtained by reference to the following detailed description and drawings.

DETAILED DESCRIPTION

According to one aspect of the present invention, the total number of subcarriers used in 40 MHz is increased to 256 subcarriers and hence the OFDM symbol duration is increased to 6.4 μs. Thus, methods and apparatus are needed for training that estimate the channel responses at all the subcarriers. In other words, the training may be increased to cover 256 subcarriers compared to the original 128 subcarriers, which has reduced system efficiency with shorter packets. In addition, the processing of 256 subcarriers requires a 256 FFT (Fast Fourier Transform) that may be considered too costly. Therefore, an implementation in accordance with the present invention optionally includes both 128 subcarriers and 256 subcarriers and leaves the choice to vendors or network managers. This requires the system to have a unified training and signaling scheme. The present invention addresses the preamble design issues for the 256 subcarrier mode in a 40 MHz channel.

According to another aspect of the present invention, a transmission scheme is provided to increase the system efficiency by increasing the OFDM system duration in a combined 40 MHz WLAN transmission. Another aspect of the present invention includes a feasible preamble that is compatible with a legacy OFDM symbol duration. The OFDM symbol structure optimizes the preamble processing accordingly.

Figure 1:
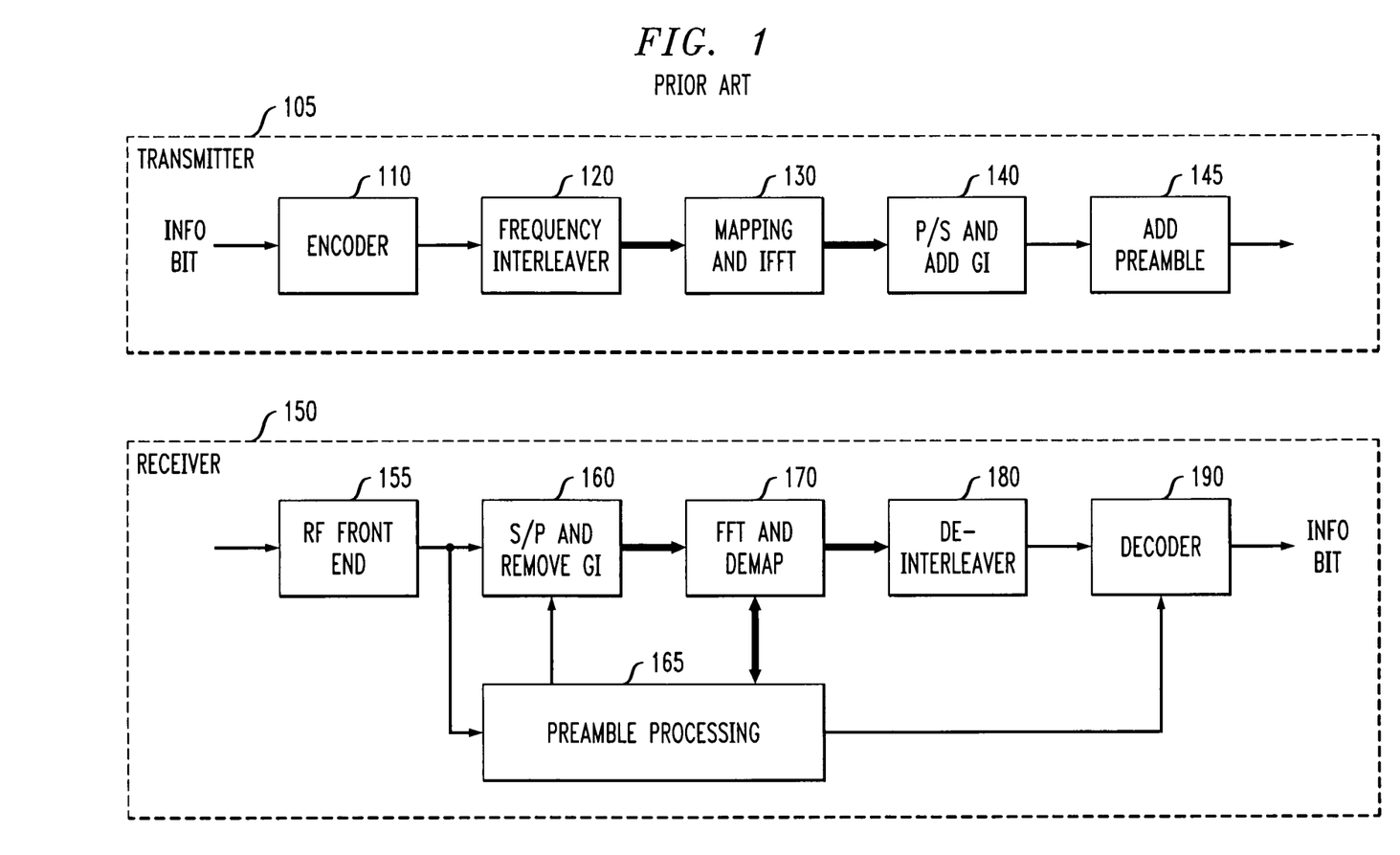
FIG. 1 is a schematic block diagram of a conventional 802.11a/g transceiver.

FIG. 1 is a schematic block diagram of a conventional 802.11a/g transceiver 100. At the transmitter side 105, the information bits are first encoded at stage 110 and then frequency interleaved at stage 120. The encoded and interleaved bits are then mapped onto subcarriers (tones) at stage 130 and form a frequency domain OFDM signal. The frequency domain OFDM signal is translated to the time domain by an inverse Fourier transform (IFFT) during stage 130. At stage 140, the data is serialized and a guard interval is added to each OFDM symbol. Finally, a preamble including training and signal fields is added during stage 145 at the beginning of each packet.

At the receiver side 150, the received signal is initially processed by the RF front end 155, and then the serial data is parallelized and the guard interval is removed at stage 160. The time domain signal is translated to the frequency domain using an FFT 170 and the subcarriers are demapped to encoded and interleaved bits. Meanwhile, the preamble is processed at stage 165. The interleaved bits are deinterleaved at stage 180 and decoded at stage 190 to provide the transmitted information bits.

Figure 2:
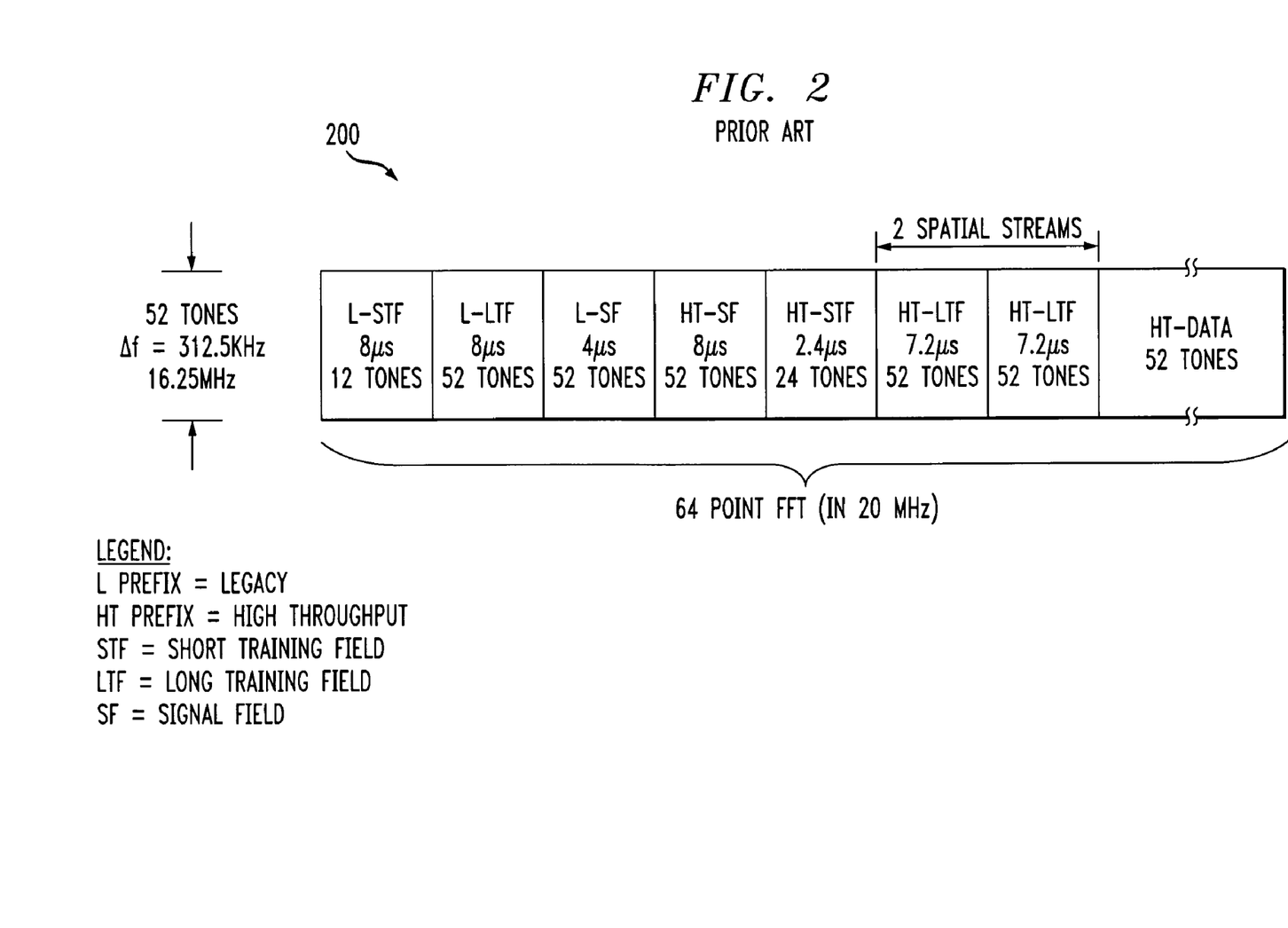
FIG. 2 illustrates an exemplary conventional preamble format for a proposed high throughput implementation in 20 MHz using 52 of 64 available subcarriers.

FIG. 2 illustrates an exemplary preamble format 200 for a proposed high throughput implementation in 20 MHz using 52 of 64 available subcarriers. Initially, the 802.11a/g legacy training (L-LTF and L-STF) and signal field (L-SF) are transmitted for backwards compatibility. It is noted that a legacy STF is comprised of 10 short training symbols, each having a duration of 0.8 μs, a legacy LTF is comprised of a 1.6 μs guard interval and two 3.2 μs long training symbols and the legacy SF is 4 μs. A high throughput SF immediately follows the legacy SF. Then, a high throughput short training (HT-STF) may follow if there is more than one transmit antenna, for automatic gain control. Then, a high throughput long training (HT-LTF) is transmitted to re-train the channel. The data transmission follows afterwards. The lengths of the high throughput SF and short training are 8 μs and 2.4 μs, respectively. The long training is proportional to the number of transmitter antennas. For example, one transmitter antenna needs 7.2 μs long training. Δf indicates the subcarrier spacing and the number of employed subcarriers is 52 tones.

Figure 3:
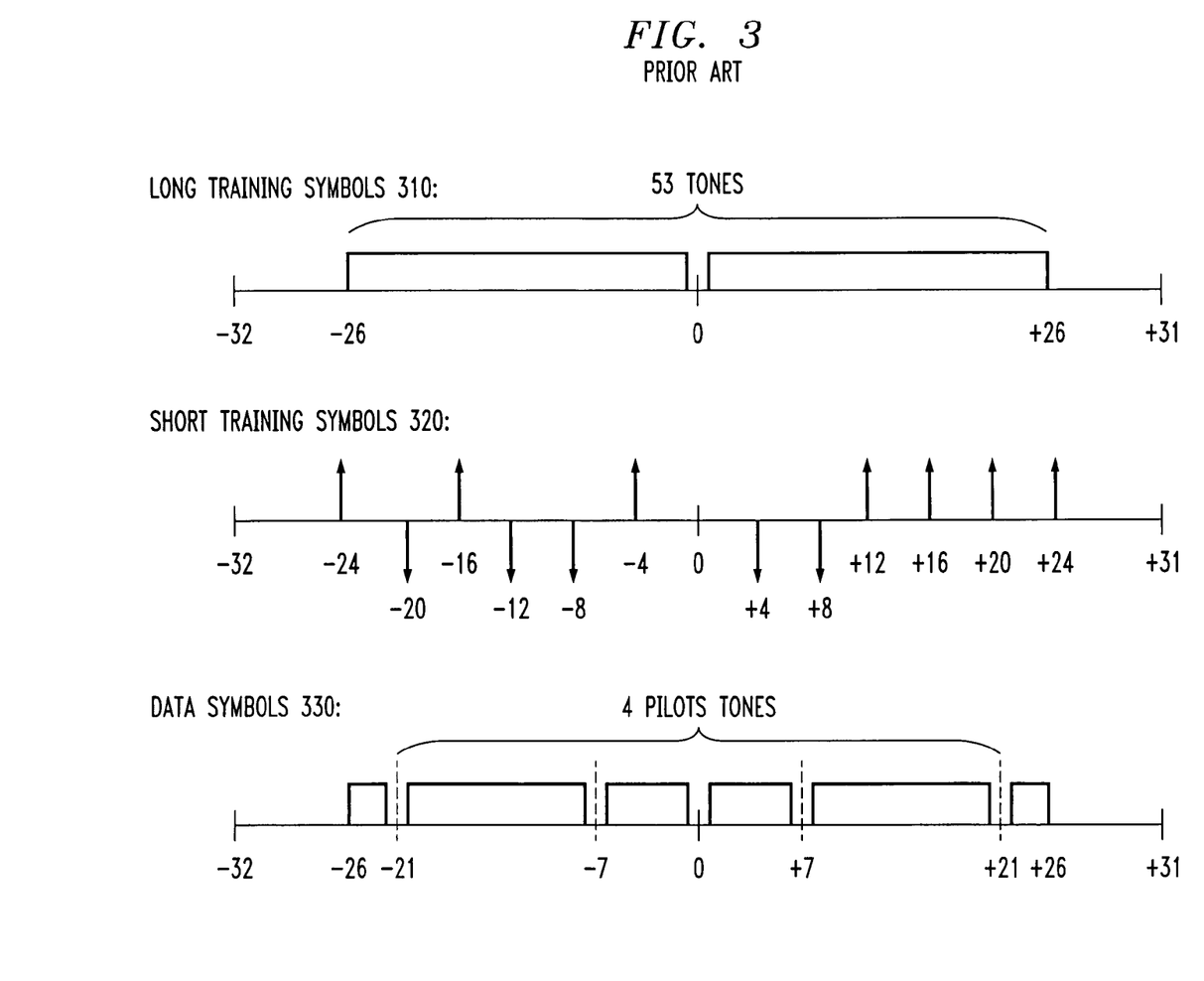
FIG. 3 illustrates the 802.11a/g 20 MHz channel structure for the preamble format of FIG. 2.

FIG. 3 illustrates the 802.11a/g 20 MHz channel structure for the preamble format 200 of FIG. 2. As shown in FIG. 3, the total bandwidth is 20 MHz which is divided equally to 64 subcarriers. Only 52 subcarries are used, such as tones −26 to −1 and 1 to 26. Besides the DC tone, the 11 edge tones are omitted for adjacent channel protection. In the long training symbol 310, the training signal is transmitted on all 52 tones. In the short training symbol 320, only 12 tones are used to form a training signal with a period of 800 ns. In a data symbol 330, 48 tones are used to carry data as shown in FIG. 3. The other four tones (−21, −7, +7 and +21) are used as pilots to track the phase and amplitude change in the channel as well as in the RF circuits.

Figure 4:
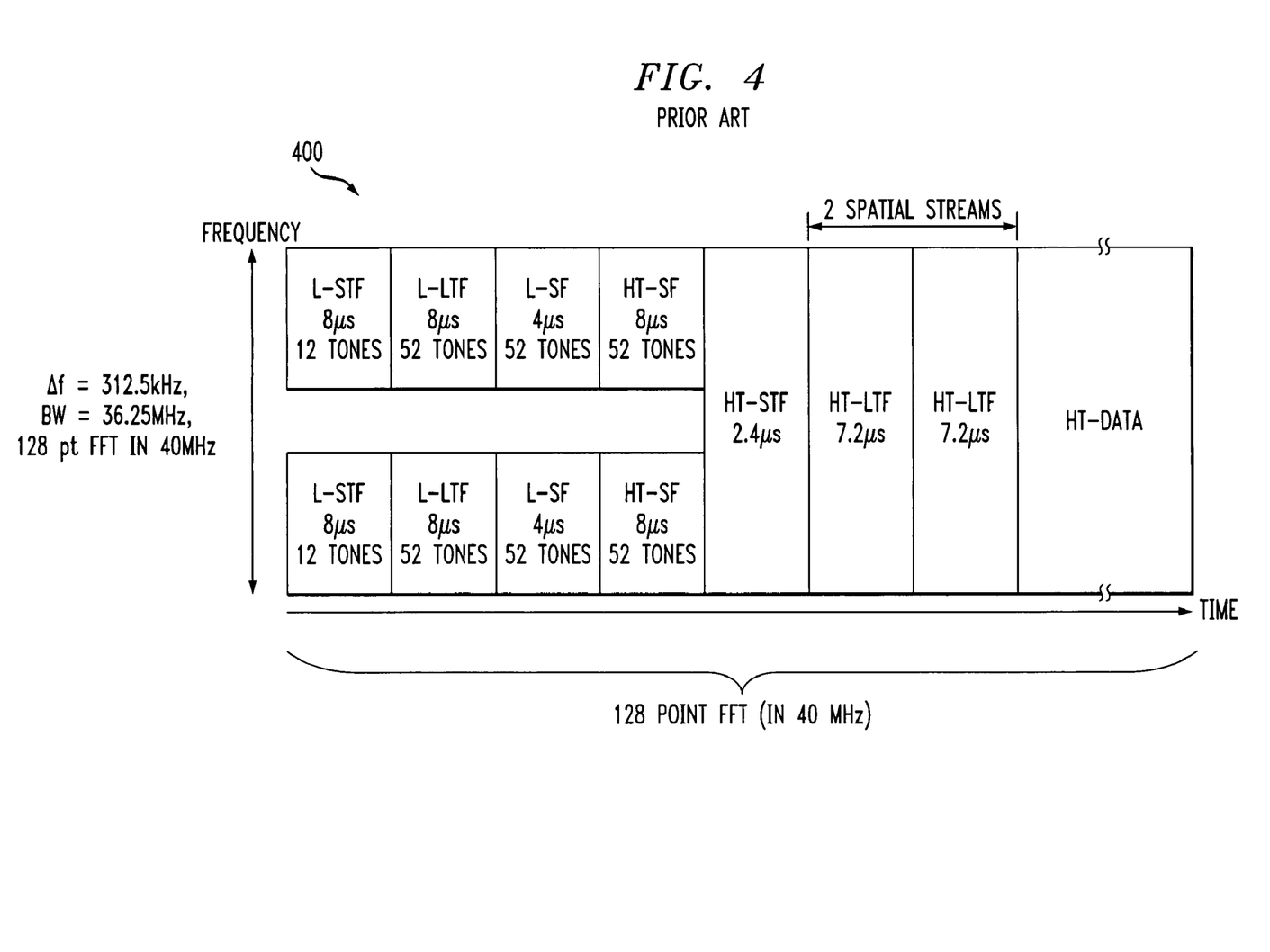
FIG. 4 illustrates an exemplary conventional preamble format for a proposed high throughput implementation in 40 MHz using 114 of 128 available subcarriers.

FIG. 4 illustrates an exemplary preamble format 400 for a proposed high throughput implementation in 40 MHz using 114 of 128 available subcarriers. As with the 20 MHz mode of FIG. 2, the format 400 comprises 802.11a/g legacy preambles (legacy short and long training fields and a legacy signal field) are transmitted simultaneously in both 20 MHz channels. This ensures that the legacy devices in either of these two 20 MHz channels can hear the legacy signal field and correctly back off. Then, a high throughput signal field is transmitted in each channel and short and long training follow as in the 20 MHz mode. Since the OFDM symbol duration does not change in 40 MHz, the length of each part of the 40 MHz preamble remains the same as that of 20 MHz preamble.

Figure 5:
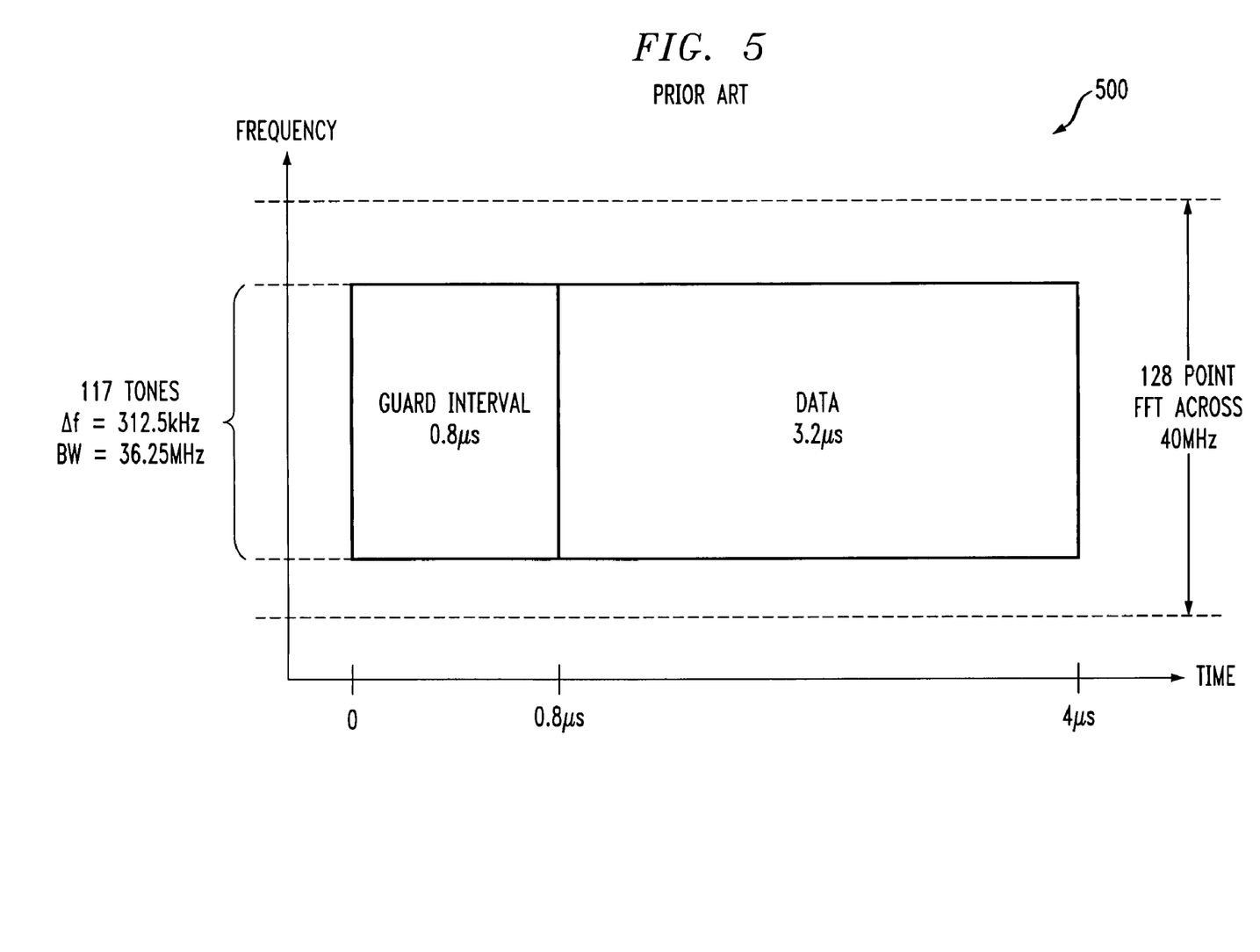
FIG. 5 illustrates a conventional design for OFDM data symbols.

FIG. 5 illustrates a conventional design for OFDM data symbols. As shown in FIG. 5, an OFDM data symbol 500 comprises a guard interval (0.8 μs duration) followed by a data field having a duration of 3.2 μs. With the symbol format 500 of FIG. 5, the percentage overhead can be expressed as:

$$\% \text{ overhead} = \frac{0.8 \text{ us}}{3.2 \text{ us}} = 25\%.$$

Figure 6:
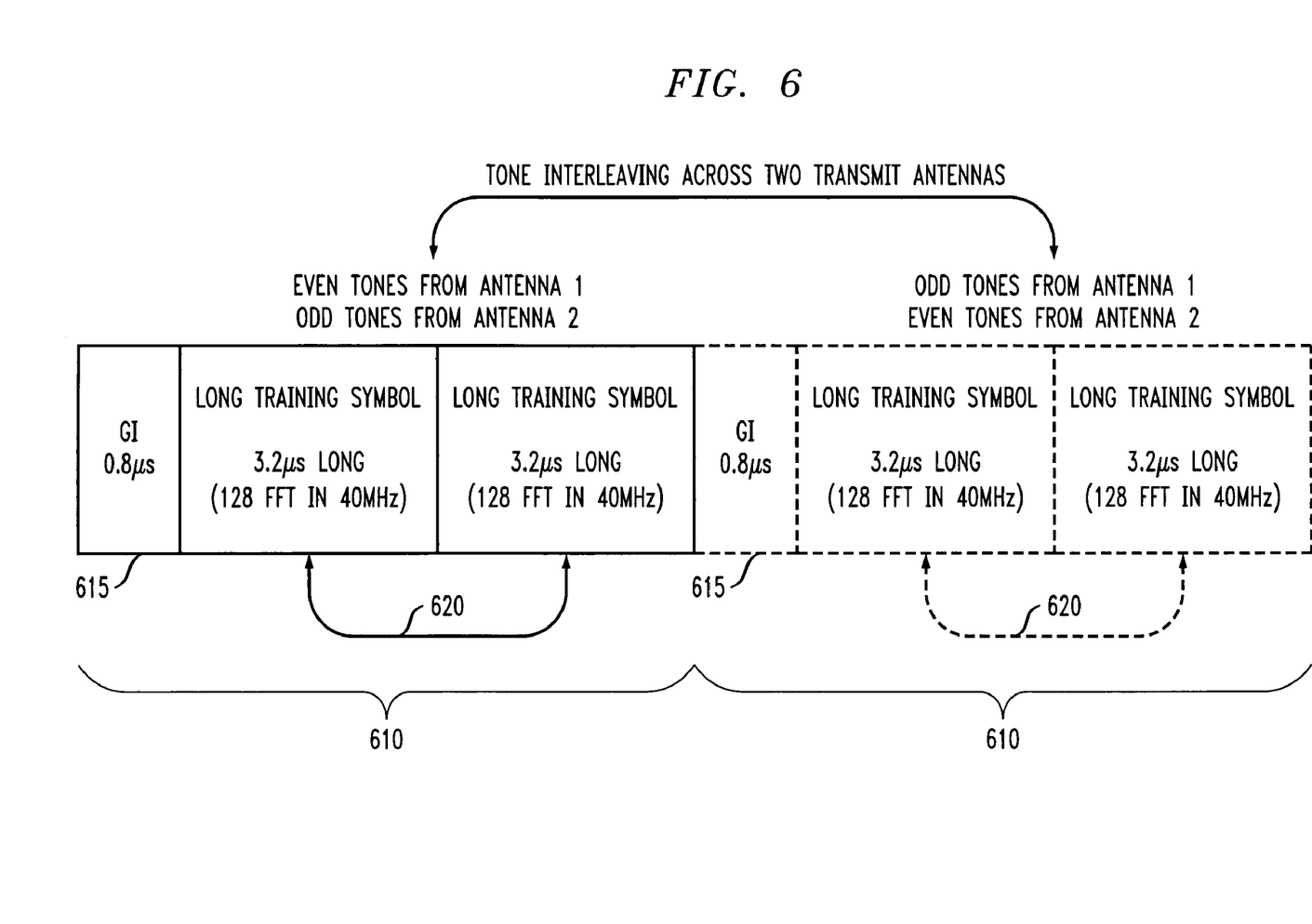
FIG. 6 illustrates a proposed design for the high throughput long training field (HT-LTF) in 40 MHz.

FIG. 6 illustrates a proposed design 600 for the high throughput long training field (HT-LTF) in 40 MHz. If more than one spatial stream is transmitted, more than one long training field is needed. One long training field 610 comprises a guard interval 615 and two identical long training symbols 620 (to aid in fine frequency offset estimation and increase energy in channel estimation by 3 dB). In any long training field 600, non-overlapped tones are transmitted from different transmitter antennas. Then, tones transmitted from the same antenna are alternated in different training fields so that all tones are trained after the long training is done. For example, even tones can be transmitted from antenna 1 and odd tones can be transmitted from antenna 2 and then odd tones can be transmitted from antenna 1 and even tones can be transmitted from antenna 2.

Figure 7:
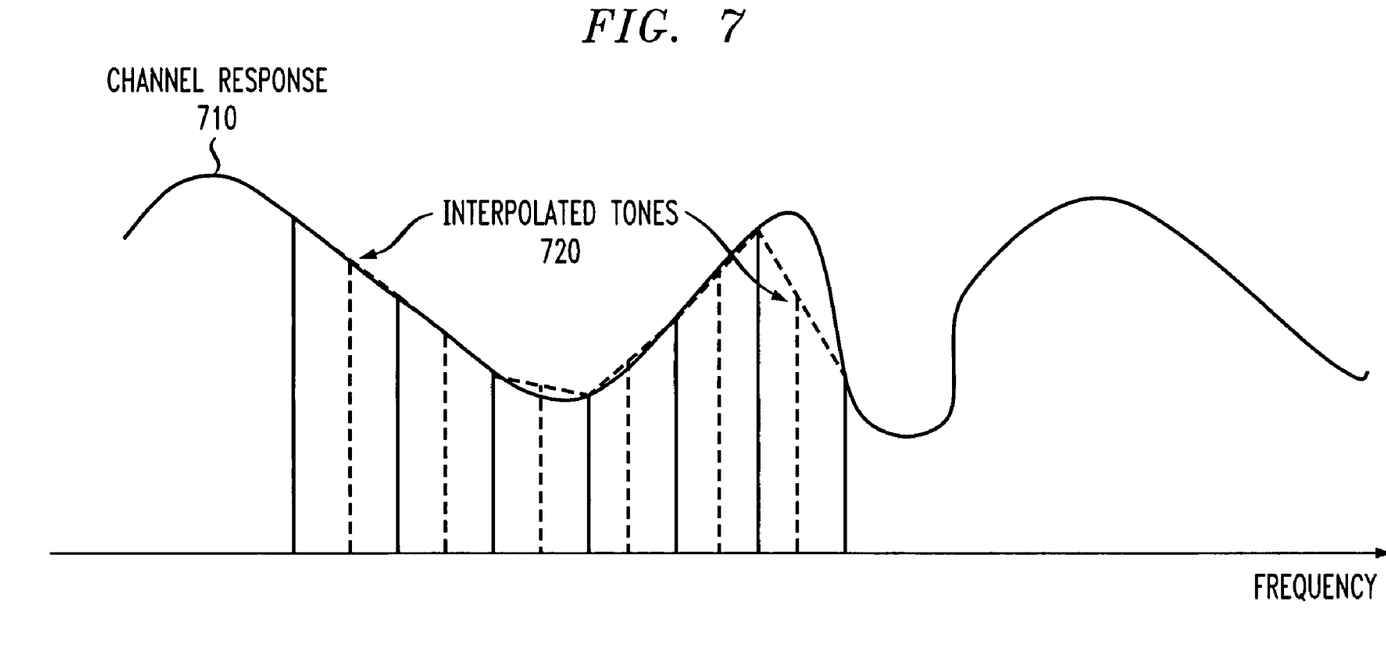
FIG. 7 illustrates an exemplary interpolation technique that may be used to estimate various tones of the channel response.

FIG. 7 illustrates an exemplary interpolation technique that may be used to estimate various tones 720 of the channel response 710. One important function of the long training field 600 is to allow the receiver to estimate the channel. With the training symbols in FIG. 3, every tone in the data symbol is trained. Therefore, the receiver only needs to compare the training tone and the received signal to get the channel information. However, since the physical channel never changes dramatically from tone to tone, all the tones do not need to be trained. As shown in FIG. 7, every other tone can be trained and the tones in between can be interpolated. The interpolator could have a different design. In the exemplary implementation shown in FIG. 7, a simple linear interpolator is employed which only uses two adjacent tones to interpolate the middle tone.

One important function performed during training is frequency offset estimation. A periodical training sequence is needed. The received training should also be periodical if no frequency offset is present. In the presence of frequency offset, the training symbol has a phase shift which linearly increases in time. Therefore, if the phase difference between two periods of training is compared, the two copies have a constant phase shift, i.e., θ. The θ relates to the frequency offset and the period of training. Thus, the frequency offset can be estimated by comparing two periods of the training sequence. The main requirement for the training sequence for the frequency offset estimation is that it has to be periodic.

256 Point FFT in 40 MHz

A natural extension of the above-described conventional implementation having a 64 point FFT in 20 MHz would be to a 128 point FFT in 40 MHz (i.e., a 2 times multiplier on the number of possible tones). According to one aspect of the invention, the efficiency (i.e., overhead percentage) is improved by employing a multiplier on the number of points in the FFT that is greater than the multiplier on the frequency (bandwidth) of the legacy 802.11a/g system. For example, in one exemplary implementation, a 256 point FFT is employed in 40 MHz (with a 4 times multiplier on the number of possible tones and a 2 times multiplier on the frequency).

While the present invention improves the efficiency for the OFDM symbol, additional overhead may be required in the preamble training (the length of the preamble is proportional to the number of tones in the FFT). Thus, according to further aspects of the invention, discussed further below in conjunction with FIGS. 9-11, a number of preamble constructs are provided that couple the improved efficiency with shorter preambles.

Figure 12:
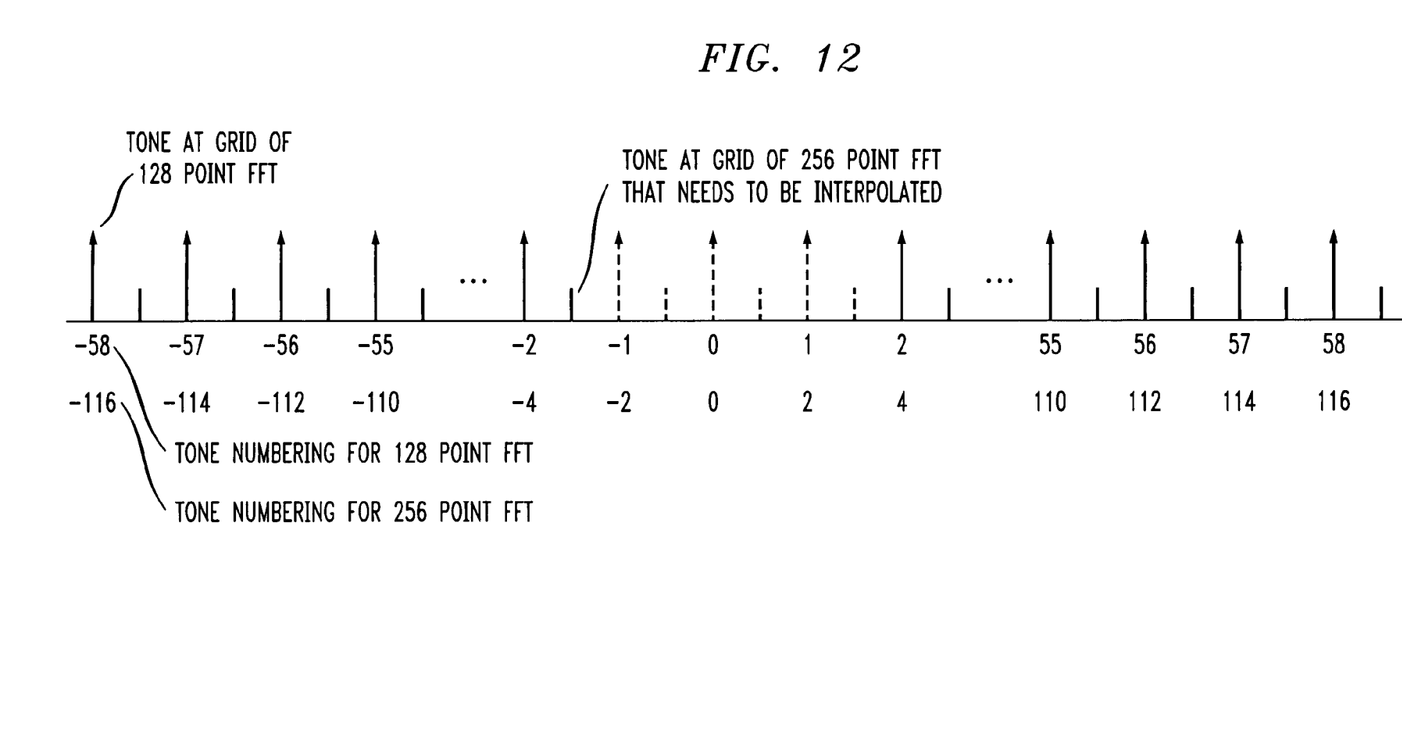
FIG. 12 illustrates an exemplary tone design for a 256 point FFT.
Figure 13:
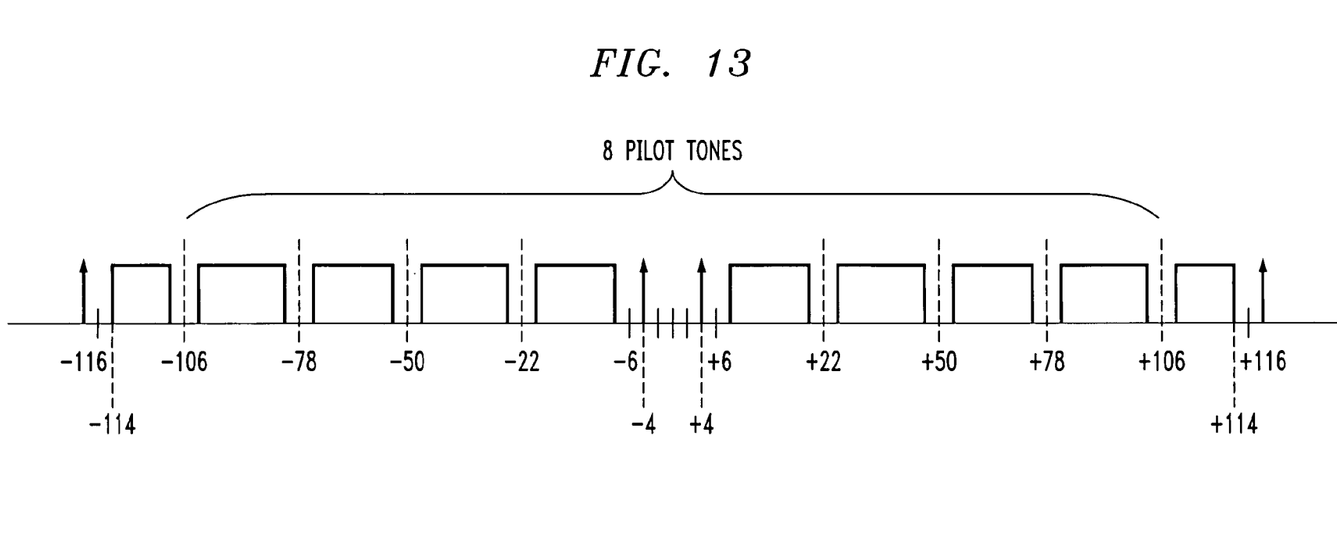
FIG. 13 illustrates an exemplary data symbol tone design for a 256 point FFT in 40 MHz.

It is noted that when using a 256 point FFT in 40 MHz, as opposed to a natural extension to a 128 point FFT, the cyclic prefix (CP) overhead is reduced, because the data is being transmitted at a higher rate, but the length of the preamble increases, because the number of tones to be trained is increased. Thus, another aspect of the invention, discussed further below in conjunction with FIGS. 12 and 13, provides a tone design that provides additional efficiency gains. Among other features, the disclosed exemplary tone design reduces the number of pilot tones, with respect to the number of populated tones, relative to a natural extension of the legacy system; increases the number of populated tones within a given bandwidth, relative to a natural extension of the legacy system; and employs central tones.

Figure 8:
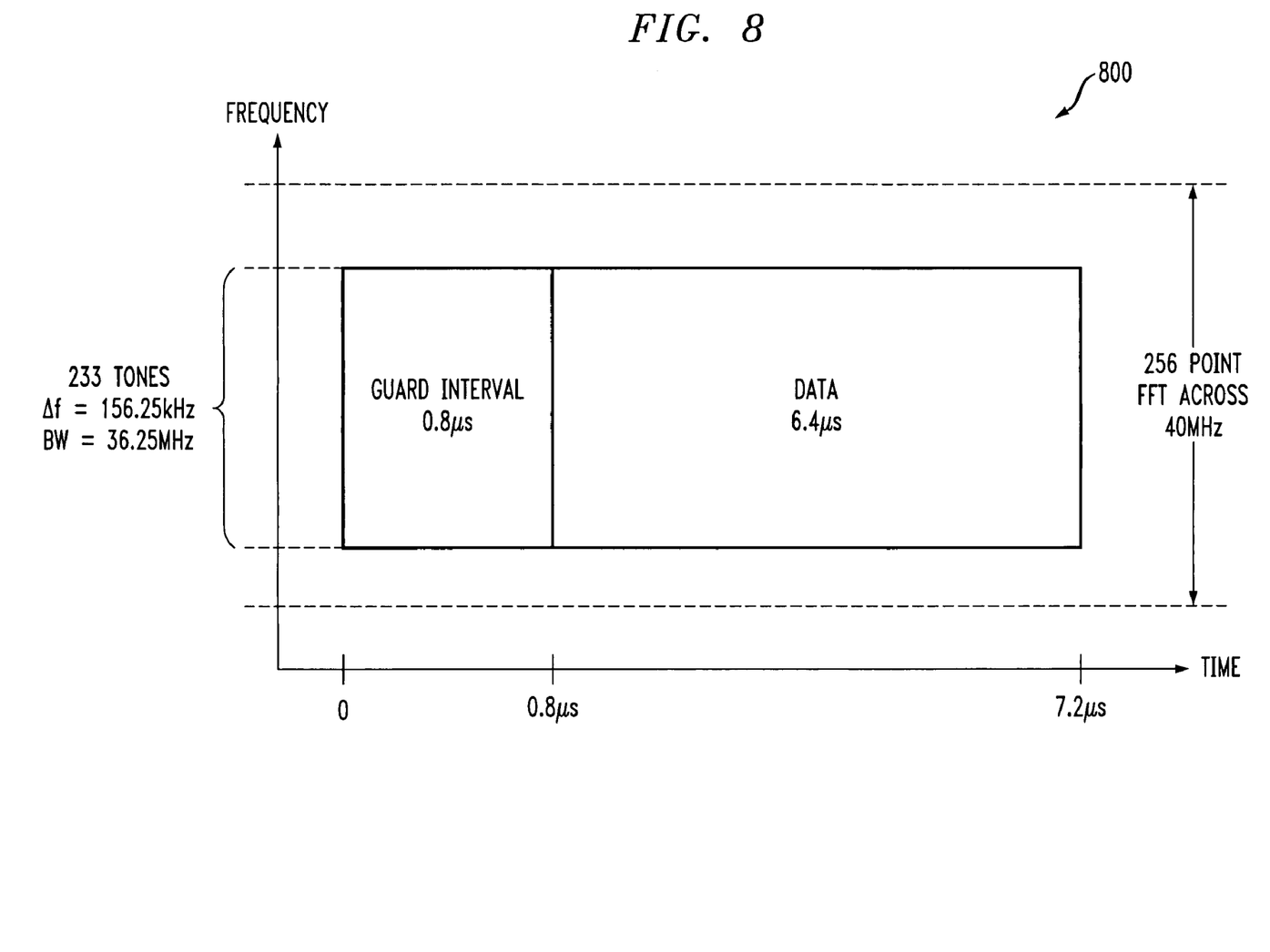
FIG. 8 illustrates a design for OFDM data symbols incorporating features of the present invention.

FIG. 8 illustrates a design 800 for OFDM data symbols incorporating features of the present invention. As shown in FIG. 8, in an exemplary implementation, an OFDM data symbol 800 comprises a guard interval (0.8 μs duration) followed by a data field having a duration of 6.4 μs. A total of 233 tones out of 256 available tones are employed to carry the signal in 40 MHz. The subcarrier spacing is 156.25 kHz. With the symbol format 800 of FIG. 8, the upper bound on the percentage overhead can be expressed as:

$$\% \text{ overhead} = \frac{0.8 \text{ us}}{6.4 \text{ us}} = 12.5\%.$$

In this manner, the Guard Interval overhead is significantly reduced. The scheme shown in FIG. 8 increases the system efficiency by increasing the OFDM symbol duration. Thus, in this exemplary OFDM data symbol structure 800, the subcarrier bandwidth is reduced to 156.25 kHz and the number of subcarriers increases to 256 in 40 MHz. Therefore, the OFDM symbol duration increases to 6.4 μs. With the 0.8 μs guard interval, the total length of an OFDM symbol is 7.2 μs. The overhead decreases to 12.5% compared to 25% in FIG. 5.

Figure 9:
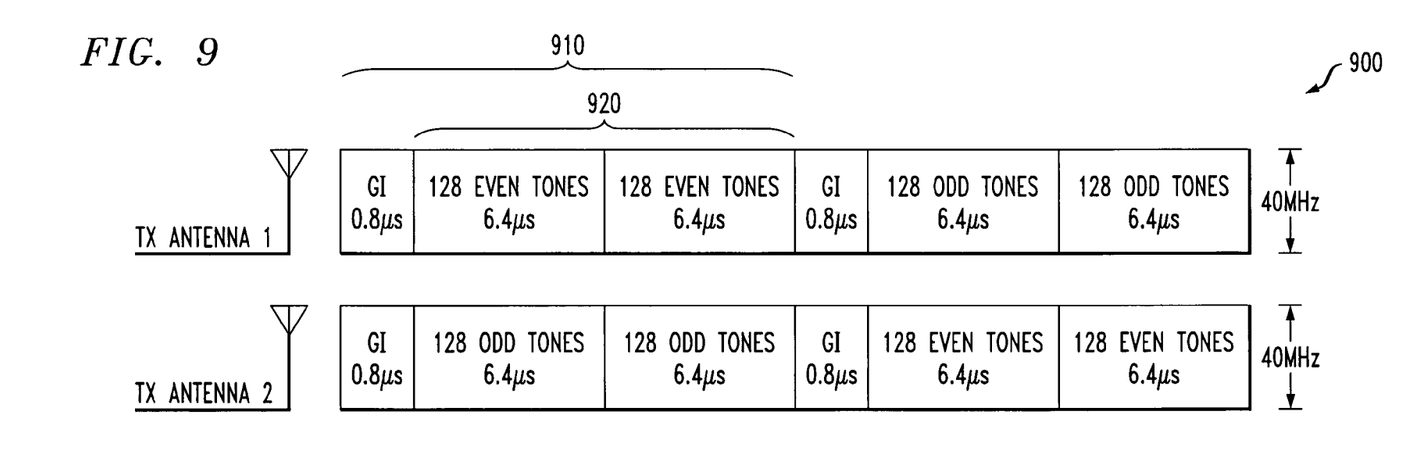
FIGS. 9 through 11 illustrate three exemplary alternative preamble designs for two spatial streams (using two transmit antennas)
Figure 10:
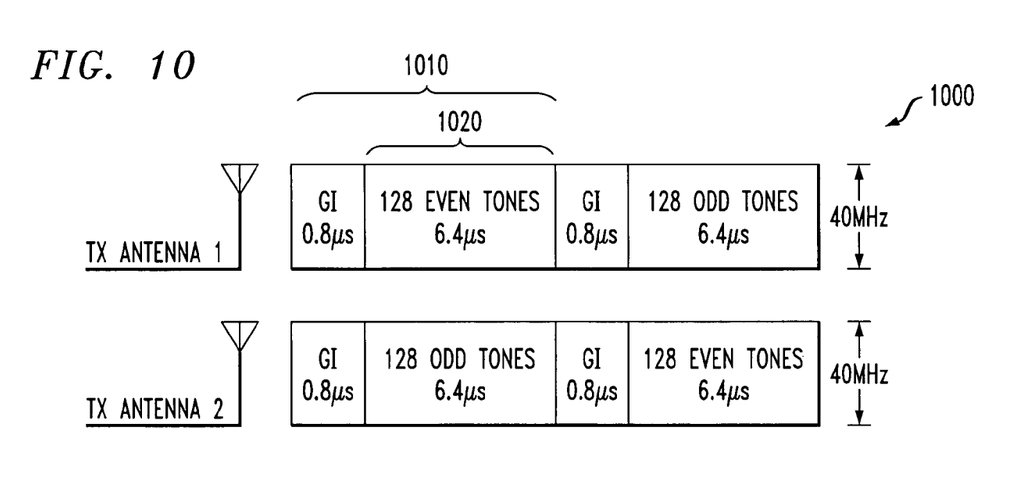
Figure 11:
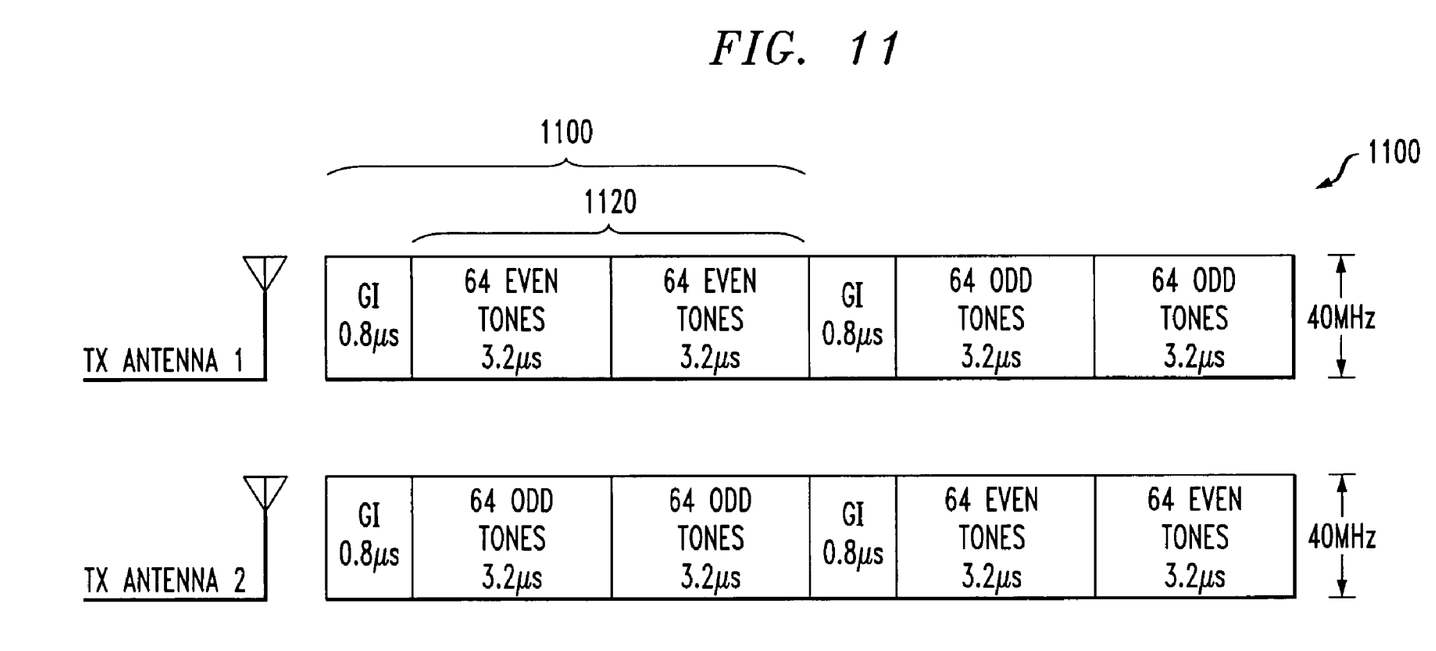

FIGS. 9 through 11 illustrate three exemplary alternative preamble designs 900, 1000, 1100, respectively, for two spatial streams (using two transmit antennas). The particular preamble design 900, 1000, 1100 that is employed can be conveyed to the receiver using a signaling mechanism in the signal field.

FIG. 9 illustrates a first exemplary alternative preamble design 900 for two spatial streams (using two transmit antennas). The preamble design 900 comprises a full preamble having two full OFDM symbols 920 (of duration 6.4 μs) per training field 910. Each tone is thus trained two times (no interpolation is required). The preamble design 900 exhibits the best performance of the three designs in FIGS. 9-11, but also has the highest overhead. The design 900 provides two copies of each symbol, which can be compared to estimate the frequency offset.

FIG. 10 illustrates a second exemplary alternative preamble design 1000 for two spatial streams (using two transmit antennas). The preamble design 1000 comprises a truncated preamble having one full OFDM symbol 1020 (of duration 6.4 μs) per training field 1010. The first OFDM symbol on the first transmitter has even tones, and the second OFDM symbol on the first transmitter has odd tones. Likewise, the first OFDM symbol on the second transmitter has odd tones, and the second OFDM symbol on the second transmitter has even tones. Each tone is thus trained once (and no interpolation is required). The preamble design 1000 exhibits a 3 dB performance degradation relative to FIG. 10, but also has less overhead. The preamble design 1000 does not allow for frequency offset estimation (other than using the legacy portion of the design 1000).

FIG. 11 illustrates a third exemplary alternative preamble design 1100 for two spatial streams (using two transmit antennas). The preamble design 1100 comprises a truncated preamble with interpolation having two truncated OFDM symbols 1120 (each of duration 3.2 μs) per training field 1110. 64 tones are trained twice which fill the 128 even tones and interpolation is required for the remaining 128 tones. The preamble design 1100 provides two truncated copies of each symbol, which can be compared to estimate the frequency offset. This preamble is exactly the preamble of 128

FFT in 40 MHz (see FIG. 6). Thus, either a 256 or 128 FFT can be used for data (requiring a signaling mechanism).

FIG. 12 illustrates an exemplary tone design for a 256 point FFT. As shown in FIG. 12, the tones in the 128 point FFT mode become even indices in the 256 point FFT mode. To carry the same amount of data in the same 6.4 μs, 216 tones must be used. However, from tones ±4 to ±116 counts for 223 tones. Consider that the odd tones may be interpolated and the interpolation could have a large error for those edge tones, such as tones ±115. Therefore, tones ±115, ±3 and ±5 are not used, in addition to the center DC tones and edge tones. Other than these 6 tones, two more pilot tones are added. Thus, for the LTF, the tones are {−116:2:−4} and {4:2:116} that carry the long training symbols. The tones whose channel state information is interpolated are {−113: 2:−7} and {7:2:113}.

FIG. 13 illustrates an exemplary data symbol tone design for a 256 point FFT in 40 MHz. The 256 point FFT provides finer granularity in frequency (more degrees of freedom). Generally, the tone design of FIG. 13 employs fewer pilot tones than would be expected for 256 point FFT, and rearranges the tones that are populated by extending the populated tones to the frequency boundaries. As previously indicated, a natural extension of a conventional implementation with a 64 point FFT in 20 MHz would be to a 128 point FFT in 40 MHz, with 6 pilot tones and 114 populated tones. The exemplary implementation of the present invention employs a 256 point FFT in 40 MHz, with 8 pilot tones and a total of 232 populated tones.

The present invention improves the transmission efficiency by increasing the OFDM symbol duration using a 256 point FFT. Moreover, the disclosed preamble and data symbol designs allow the system to use the same preamble as the 128 point FFT mode. Thus, the transmitter can select the transmission mode, which further allows the vendor to choose the most suitable hardware implementation.

For example, relative to a legacy 802.11a/g system and a natural extension of such a legacy 802.11a/g system, an exemplary embodiment of the present invention may be implemented as follows:

|  | Legacy System | Natural Extension | Exemplary Embodiment |
| --- | --- | --- | --- |
| Bandwidth | 20 MHz | 40 MHz | 40 MHz |
| FFT Size | 64 | 128 | 256 |
| No. Populated Tones | 52 | 104 | 232 |
| No. Pilot Tones | 4 | 8 | 8 |

It is to be understood that the embodiments and variations shown and described herein are merely illustrative of the principles of this invention and that various modifications may be implemented by those skilled in the art without departing from the scope and spirit of the invention.

We claim:

1. A method for transmitting data in a multiple antenna communication system, wherein said multiple antenna communication system communicates with at least one single antenna communication system employing an $N_1$ point inverse fast Fourier transform (FFT) within a bandwidth, $BW_1$, said method comprising:

employing an $N_2$ point inverse FFT within a bandwidth, $BW_2$, where $N_2/N_1$ is a number greater than $BW_2/BW_1$ and where $BW_1$ does not equal $BW_2$.

2. The method of claim 1, wherein $N_1$ is a 64 point inverse FFT within a bandwidth, $BW_1$, equal to 20 MHz, and $N_2$ is a 256 point inverse FFT within a bandwidth, $BW_2$, equal to 40 MHz.

3. The method of claim 1, further comprising the step of employing a training preamble that comprises at least two OFDM symbols per training field.

4. The method of claim 3, wherein each tone is trained at least two times.

5. The method of claim 3, further comprising the step of comparing two copies of each symbol to estimate a frequency offset.

6. The method of claim 1, further comprising the step of employing a truncated training preamble that comprises one OFDM symbol per training field.

7. The method of claim 6, wherein a first OFDM symbol on a first transmitter has even tones, and a second OFDM symbol on said first transmitter has odd tones and said first OFDM symbol on a second transmitter has odd tones, and said second OFDM symbol on said second transmitter has even tones.

8. The method of claim 6, wherein each tone is trained one time.

9. The method of claim 1, further comprising the step of employing a truncated training preamble that comprises two truncated OFDM symbols for each training field.

10. The method of claim 9, further comprising the steps of training a portion of the total number of tones, and interpolating a remainder of said tones.

11. The method of claim 9, further comprising the step of comparing two truncated copies of each symbol to estimate a frequency offset.

12. The method of claim 9, wherein said truncated training preamble is compatible with said at least one single antenna communication system.

13. The method of claim 1, wherein said single antenna communication system employs a total number of populated tones $N_{pop_1}$, said method further comprising the step of employing a total number of populated tones $N_{pop_2}$, where $N_{pop_2}/N_{pop_1}$ is a number greater than $BW_2/BW_1$.

14. The method of claim 1, wherein said single antenna communication system employs a number of pilot tones $N_{pilot_1}$, said method further comprises the step of employing a number of pilot tones $N_{pilot_2}$, where $N_{pilot_2}/N_{pilot_1}$ is a number less than or equal to $BW_2/BW_1$.

15. The method of claim 1, further comprising the step of employing one or more central tones.

16. A transmitter that transmits data in a multiple antenna communication system, wherein said multiple antenna communication system communicates with at least one single antenna communication system employing an $N_1$ point inverse fast Fourier transform (FFT) within a bandwidth, $BW_1$, said transmitter comprising:

an $N_2$ point inverse FFT within a bandwidth, $BW_2$, where $N_2/N_1$ is a number greater than $BW_2/BW_1$ and where $BW_1$ does not equal $BW_2$.

17. The transmitter of claim 16, wherein $N_1$ is a 64 point inverse FFT within a bandwidth, $BW_1$, equal to 20 MHz, and $N_2$ is a 256 point inverse FFT within a bandwidth, $BW_2$, equal to 40 MHz.

18. The transmitter of claim 16, wherein a training preamble comprises at least two OFDM symbols per training field.

19. The transmitter of claim 16, wherein a truncated training preamble comprises one OFDM symbol per training field.

20. The transmitter of claim 16, wherein a truncated training preamble comprises two truncated OFDM symbols for each training field.

21. The transmitter of claim 20, wherein said truncated training preamble is compatible with said at least one single antenna communication system.

22. The transmitter of claim 16, wherein said single antenna communication system employs a total number of populated tones $N_{pop_1}$ and said transmitter employs a total number of populated tones $N_{pop_2}$, where $N_{pop_2}/N_{pop_1}$ is a number greater than $BW_2/BW_1$.

23. The transmitter of claim 16, wherein said single antenna communication system employs a number of pilot tones $N_{pilot_1}$, and said transmitter employs a number of pilot tones $N_{pilot_2}$, where $N_{pilot_2}/N_{pilot_1}$ is a number less than or equal to $BW_2/BW_1$.

24. The transmitter of claim 16, wherein said transmitter employs one or more central tones.

25. A method for receiving data in a multiple antenna communication system, wherein said multiple antenna communication system communicates with at least one single antenna communication system employing an $N_1$ point inverse fast Fourier transform (FFT) within a bandwidth, $BW_1$, said method comprising:

employing an $N_2$ point FFT within a bandwidth $BW_2$, where $N_2/N_1$ is a number greater than $BW_2/BW_1$ and where $BW_1$ does not equal $BW_2$.

* * * * *

UNITED STATES PATENT AND TRADEMARK OFFICE
CERTIFICATE OF CORRECTION

PATENT NO. : 7,366,250 B2
APPLICATION NO. : 11/122147
DATED : April 29, 2008
INVENTOR(S) : Mujtaba et al.

It is certified that error appears in the above-identified patent and that said Letters Patent is hereby corrected as shown below:

In the specification, column 4, lines 52-53, that portion of the formula reading " $\frac{0.6 \, us}{3.2 \, us}$ " should read -- $\frac{0.8 \mu s}{3.2 \mu s}$ --.

In the specification, column 6, lines 12-13, that portion of the formula reading " $\frac{0.8 \, us}{6.4 \, us}$ " should read -- $\frac{0.8 \mu s}{6.4 \mu s}$ --.

In claim 25, column 10, line 12, after "bandwidth" insert --,--.

Signed and Sealed this

Twenty-first Day of October, 2008

JON W. DUDAS
*Director of the United States Patent and Trademark Office*